United States Patent [19]

Malsky

[11] Patent Number: 4,645,961
[45] Date of Patent: Feb. 24, 1987

[54] DYNAMOELECTRIC MACHINE HAVING A LARGE MAGNETIC GAP AND FLEXIBLE PRINTED CIRCUIT PHASE WINDING

[75] Inventor: Herbert Malsky, Belmont, Mass.

[73] Assignee: The Charles Stark Draper Laboratory, Inc., Cambridge, Mass.

[21] Appl. No.: 482,180

[22] Filed: Apr. 5, 1983

[51] Int. Cl.[4] ............................................. H02K 21/14
[52] U.S. Cl. ..................................... 310/156; 310/254; 310/DIG. 6
[58] Field of Search ............... 310/154, 156, 265, 266, 310/268, 269, 254, 261, 171, 207, DIG. 6

[56] References Cited

U.S. PATENT DOCUMENTS

| | | | |
|---|---|---|---|
| 2,441,960 | 3/1945 | Eisler | 41/43 |
| 2,773,239 | 12/1956 | Parker | 324/150 |
| 2,847,589 | 8/1958 | Haydon | 310/DIG. 6 |
| 2,970,238 | 1/1961 | Swigget | 310/268 |
| 3,023,333 | 2/1962 | Swiggett | 310/268 |
| 3,023,334 | 2/1962 | Burr et al. | 310/268 |
| 3,023,335 | 2/1962 | Burr | 310/268 |
| 3,036,248 | 12/1959 | Nellist | 317/166 |
| 3,095,516 | 6/1963 | Moressee et al. | 310/268 |
| 3,259,768 | 7/1966 | Burr | 310/13 |
| 3,324,323 | 6/1967 | Henry-Baudot | 310/203 |
| 3,470,408 | 9/1969 | Lewis et al. | 310/168 |
| 3,602,749 | 8/1971 | Esters | 310/154 |
| 3,609,431 | 9/1971 | Lifschitz | 310/266 |
| 3,629,626 | 12/1971 | Abbott | 310/49 |
| 3,650,021 | 3/1972 | Karol | 310/266 |
| 3,671,788 | 6/1972 | Knudson | 310/156 |
| 3,698,079 | 10/1972 | Lifschitz | 310/266 |
| 3,725,708 | 3/1973 | Possis | 310/179 |
| 3,726,004 | 4/1973 | Holland | 29/602 |
| 3,904,902 | 9/1975 | Inariba | 310/162 |
| 3,906,268 | 9/1975 | de Graffenried | 310/154 |
| 3,909,647 | 9/1975 | Peterson | 310/156 |
| 3,944,857 | 3/1976 | Faulhaber | 310/266 |
| 4,039,075 | 8/1977 | Morreale | 310/194 |
| 4,080,542 | 3/1978 | de Graffenried | 310/159 |
| 4,096,625 | 6/1978 | Morreale | 310/71 |
| 4,100,443 | 7/1978 | Kuwako | 310/164 |
| 4,208,784 | 6/1980 | Kincel | 29/596 |
| 4,224,543 | 9/1980 | Morreale | 310/71 |
| 4,228,384 | 10/1980 | Arnold, Jr. et al. | 310/268 |
| 4,268,769 | 5/1981 | Dorner et al. | 310/67 R |

OTHER PUBLICATIONS

Malsky, "Printed Winding DC Torque Motor", Draper Laboratory Contract Report, May 1976, Cambridge, Mass., 02139, #C-4643.

Primary Examiner—Patrick R. Salce
Assistant Examiner—D. Rebsch
Attorney, Agent, or Firm—Weingarten, Schurgin Gagnebin & Hayes

[57] ABSTRACT

A dynamoelectric machine having a large magnetic gap and flexible printed circuit phase windings includes a multi-pole samarium cobalt magnet assembly consisting of radially aligned magnets and circumferentially positioned interpole magnets attached to a soft iron ring for providing radially directed magnetic poles of alternating polarity, and a printed circuit winding assembly attached to a soft back iron sleeve for providing electromagnetic poles. The printed circuit winding assembly comprises a lamination of selectively aligned and interconnected printed circuit phase windings, each having serially connected printed circuit coils of the same phase. The winding and magnet assemblies are separated by a small mechanical gap to allow their relative rotation. The magnets and soft iron structures are proportioned to operate near the maximum energy product condition for Samarium Cobalt, where the sum of the mechanical gap thickness and the winding assembly thickness is the magnetic gap in a high reluctance circuit. A large volume of windings is placed within the permanent magnet field and entirely within the magnetic gap to provide a large ampere-turn condition at a low power dissipation. Brushless DC single and multiphase torquers, brush-type DC torquers, stepper motors, and synchronous motors embodying the dynamoelectric machine of the present invention are highly efficient devices having a very low magnetic drag torque and a magnetic cogging torque substantially equal to zero.

20 Claims, 10 Drawing Figures

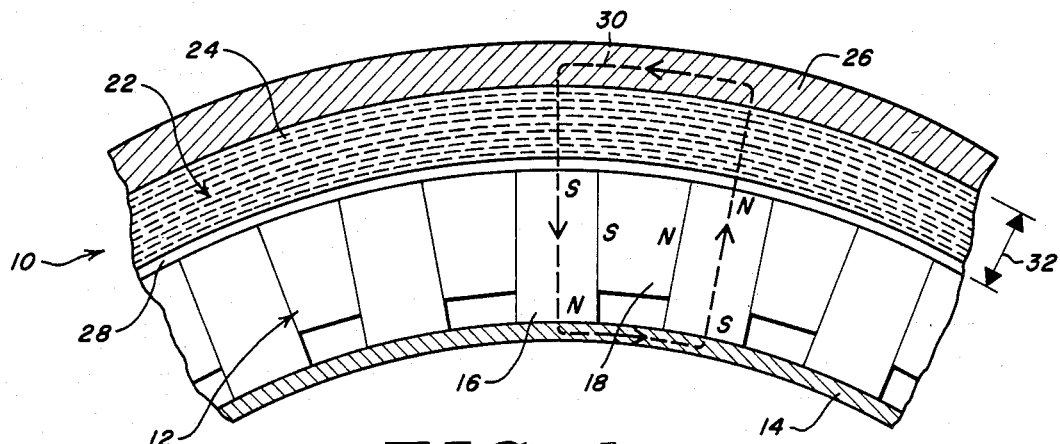
FIG. 1
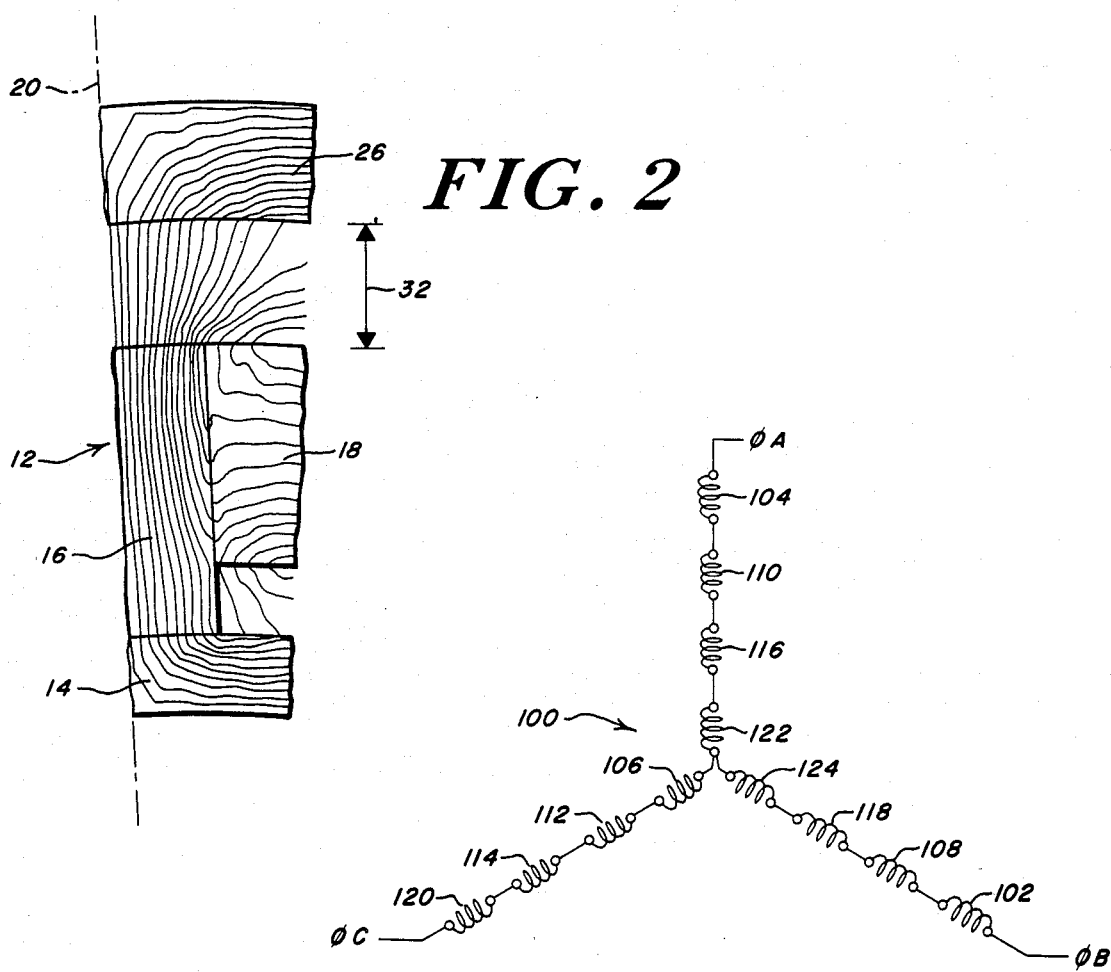
FIG. 2
FIG. 4D

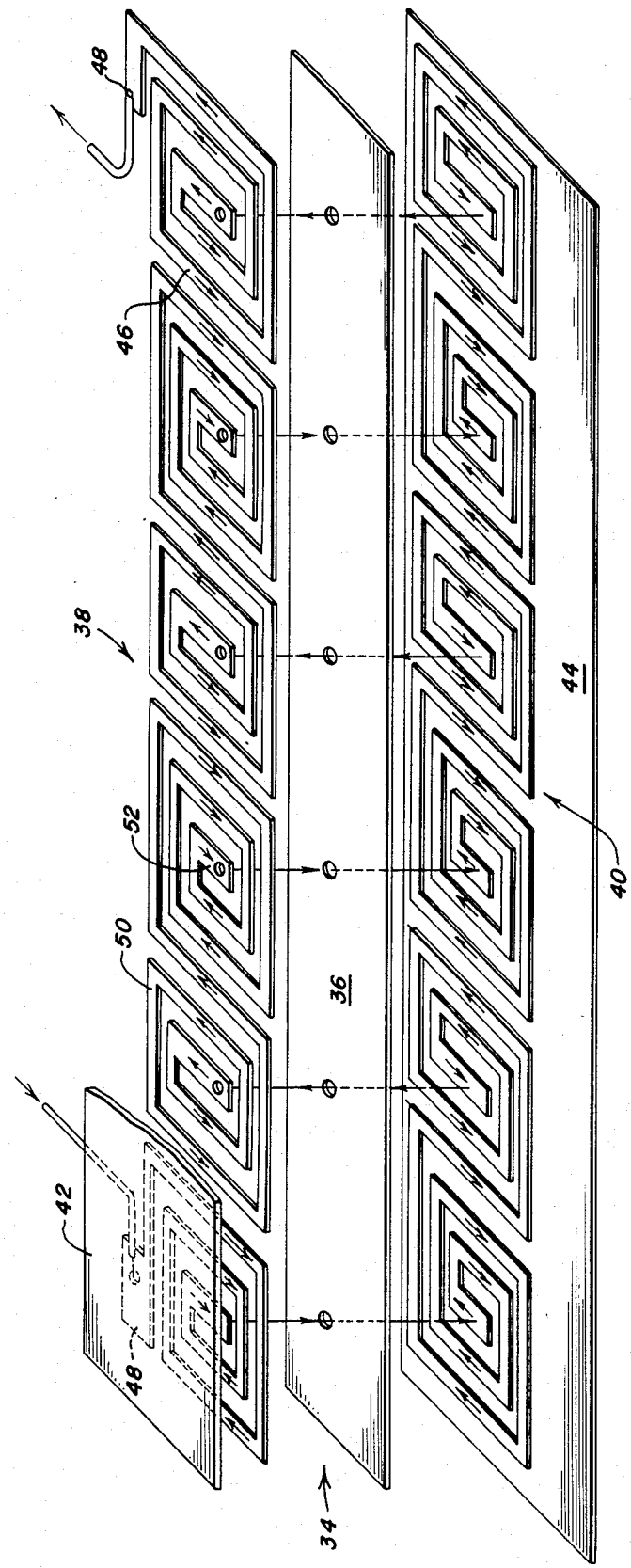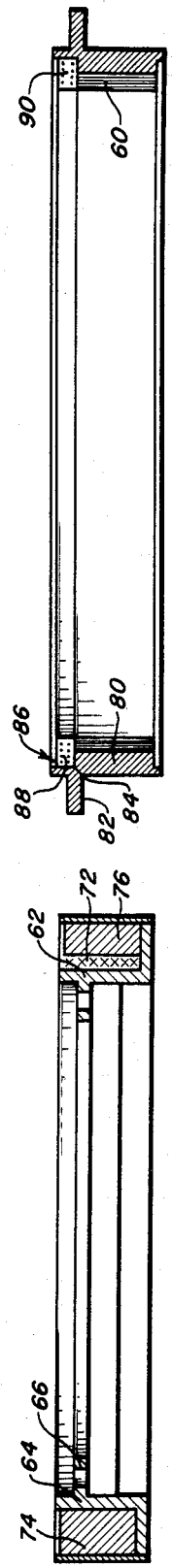
FIG. 3
FIG. 4B
FIG. 4C

DYNAMOELECTRIC MACHINE HAVING A LARGE MAGNETIC GAP AND FLEXIBLE PRINTED CIRCUIT PHASE WINDING

FIELD OF THE INVENTION

The invention is directed to the field of dynamoelectric machines, and more particularly, to a novel dynamoelectric machine having a large magnetic gap and flexible printed circuit phase windings.

BACKGROUND OF THE INVENTION

Dynamoelectric machines typically employ permanent magnet structures and cooperative electromagnet structures for producing rotating magnetic fields that controllably transduce electrical energy into mechanical energy. In many applications, such machines are called upon to provide precise torque characteristics including low magnetic drag and cogging torque, and to provide a high ampere-turn condition at a low power dissipation in a highly reliable configuration. The most efficient known machines have a permanent magnet field structure separated from a wire-wrapped toothed-core armature by a small magnetic gap but produce undesirably high values of both drag and cogging torque, among others, in many applications. The known brush commutated printed circuit electromagnet structures have so-called wave-windings of printed circuit coils that are typically interconnected to commute individual ones of the coils for phasing purposes. However, the printed circuit wave-winding electromagnet structures not only require larger than desirable currents for a given ampere-turn condition and associated bulky insulation material but also utilize unreliable and complex coil interconnections.

SUMMARY OF THE INVENTION

The novel dynamoelectric machine of the present invention includes a magnetic assembly having samarium cobalt permanent magnets that are symmetrically mounted to a first annular highly permeable magnetic circuit device for providing a plurality of radially aligned permanent magnetic poles of alternating polarity. A winding assembly having a laminated structure of overlaid printed circuit phase windings is mounted to a second annular highly permeable magnetic circuit device. The winding and magnet assemblies are concentrically aligned defining a large magnetic gap and are separated by a small mechanical gap to allow their relative rotation. The geometry of the samarium cobalt magnets and the interspecing between the annular magnetic circuit devices are selected to provide operation near the maximum energy product condition for Samarium Cobalt magnetic material, where the sum of the mechanical gap radial thickness and the winding assembly radial thickness defines a large magnetic gap in a high reluctance magnetic circuit. Each of the phase windings of the winding assembly have a preselected number of serially connected printed circuit coils of substantially identical phase, and the layers are selectively aligned mechanically and interconnected electrically to provide electromagnetic poles having one or more phases. The printed circuit phase windings are positioned in the large magnetic gap and within the field of the permanent magnets and provide a high ampere-turn condition at a low power dissipation. DC brushless torquers, brush-type torquers, synchronous motors, stepper motors, among others, embodying the large magnetic gap dynamoelectric machine having printed circuit phase windings of the present invention provide a very low magnetic drag torque and a magnetic cogging torque substantially equal to zero.

BRIEF DESCRIPTION OF THE DRAWINGS

The invention will become better understood by referring to the following exemplary and non-limiting detailed description of the invention, and to the drawings, wherein:

FIG. 1 is a simplified and fragmentary diagram illustrating the large magnetic gap dynamoelectric machine having flexible printed circuit phase windings of the present invention;

FIG. 2 is a schematic diagram illustrating the flux pattern of the magnet assembly of the large magnetic gap dynamoelectric machine having flexible printed circuit phase windings of the present invention;

FIG. 3 is a simplified and exploded isometric diagram illustrating a flexible printed circuit phase winding of the large magnetic gap dynamoelectric machine having flexible printed circuit phase windings of the present invention;

DETAILED DESCRIPTION OF THE PREFERRED EMBODIMENTS

Figure 4A:
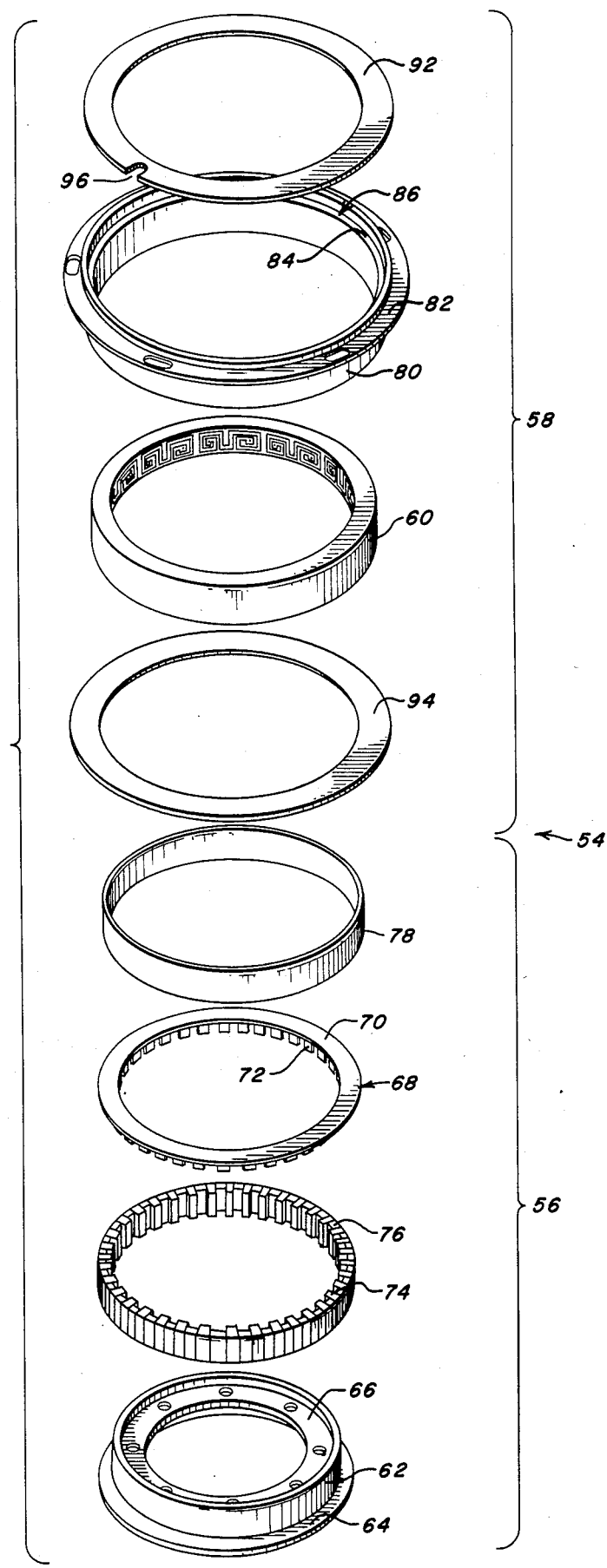
FIG. 4 shows in FIG. 4A an exploded perspective view of; shows in FIG. 4B a sectional view through the magnet assembly; shows in FIG. 4C a sectional view through the winding assembly; shows in FIG. 4D a schematic view of, and shows in FIG. 4E an exploded diagramatic view of, a three-phase brushless DC torquer embodying the large magnetic gap dynamoelectric machine having flexible printed circuit phase windings of the present invention.

Referring now to FIG. 1, generally designated at 10 is a simplified and fragmentary diagrammatic view illustrating the large magnetic gap dynamoelectric machine having flexible printed circuit phase windings of the present invention. The machine 10 includes a magnet assembly generally designated 12 mounted to an annular magnetic device 14 having a high permeance. The magnet assembly 12 preferably includes a plurality of radially aligned Sarmarium Cobalt (Sm Co) main magnets 16 and circumferentially aligned Samarium Cobalt interpole magnets 18 positioned between and abutting adjacent ones of the radially aligned magnets 16. Each of the interpole magnets is magnetically oriented in respect to the adjacent main magnets, with the North seeking pole of the interpole magnet adjacent the North seeking pole of one of the main magnets and with the South seeking pole of the interpole magnet adjacent the South seeking pole of the other one of adjacent ones of the main magnets. As shown in FIG. 2, the flux produced by the magnet assembly 12 is substantially radially aligned about the center line 20 of each of the main magnets. Reference may be had to Kober, U.S. Pat. No. 3,334,254, incorporated herein by reference, for its disclosure of a small magnetic gap dynamoelectric machine having a main and an interpole magnet structure operative to minimize circumferential flux leakage.

A winding assembly generally designated 22 to be described having a lamination of printed circuit phase windings 24, twelve of which are schematically illustrated, is mounted to an annular magnetic device 26 having a high permeance. The winding assembly 22 is concentrically disposed around the magnet assembly 12 and a small mechanical gap 28 is provided to permit the relative rotation of the magnet and winding assemblies. It will be appreciated that a housing having the usual shaft and bearings, not illustrated, is employed to restrain the assemblies radially and axially. It is to be noted that the magnet assembly 12 may be mounted to the member 26 and that the assembly 22 may be mounted to the member 14 without departing from the inventive concept.

The orientation of the magnets 16 and 18 and the geometry and spaced-apart relation of the magnetic devices 14 and 26 provide a flux path, shown dashed at 30, having a high reluctance large magnetic gap 32. The flexible printed circuit winding assembly 22 is disposed entirely in the magnetic gap 32 which allows for the provision of a large number of coils, a large ampere-turn condition, and a low power dissipation. The radial dimension of the magnetic gap 32, and the geometry for the Sm Co magnets 16 and 18, are selected to provide a magnetic induction in the flux path 30 at a level on the characteristic demagnetization curves for Sm Co at or near the point of maximum energy product. As appears more fully below, the winding and magnet assemblies of the large magnetic gap dynamoelectric machine having flexible printed circuit phase windings of the present invention can be configured to operate as a brushless DC torquer, as a brush-type DC torquer, as a stepper motor, and as a synchronous motor, among other configurations.

Referring now to FIG. 3, generally designated at 34 is a simplified and exploded isometric view of a printed circuit phase winding of the winding assembly of the large magnetic gap dynamoelectric machine according to the present invention. Multiple printed circuit phase windings are selectively mechanically aligned, selectively interconnected, and laminated together to form a winding assembly having intended characteristics in a manner to be described. The printed circuit phase winding 34 includes a flexible substrate 36 such as Mylar having on the upper surface thereof an array of printed circuit coils generally designated 38 and on the lower surface thereof an array of printed circuit coils generally designated 40. The coils 38 and 40 preferably are provided as etched metalization patterns on the upper and lower surfaces of the substrate 36 using conventional photolithographic methods. A layer of an electrically insulative material 42 is disposed over the top array 38 and a layer of an electrically insulative material 44 is disposed over the bottom array 40.

The upper array of printed circuit coils 38 includes half-coils 46 positioned one at each of the ends thereof having end terminal pads 48 for electrical interconnection purposes, and a plurality of whole-coils 50, two of which are illustrated, extending in a line in close proximity between the end half-coils 46. The coils 50 each consist of a half-coil having turns spiralling in an electrically counterclockwise direction that is serially connected to and integrally formed with a half-coil having turns spiralling in an electrically clockwise direction. An electrical current flowing in each of the full coils produces a flux in one direction in one of the half-coils thereof and produces a flux in an opposite direction in the other one of the half-coils thereof in accordance with the right hand rule. Terminal pads 52 are centrally provided in the half-coils 46, and are centrally provided in each of the half-coils of the whole-coils 50.

The lower array of printed circuit coils 40 is identical to the upper array of printed circuit coils 38 except that there are no end half-coils provided therein. The lower array is laterally spaced from the upper array a distance that equals the linear extent of a half-coil to mechanically align the windings of the half-coils of the upper array with the windings of the half-coils of the lower array and to mechanically align corresponding ones of the upper and lower central terminal pads 52. The terminal pads 52 of the aligned upper and lower half-coils are connected by plated-through holes or other suitable means to provide a serial electrical connection between all of the coils of the phase winding 34. As designated by the arrows, electrical current applied to the left-hand end terminal pad 48 sequentially passes through the conductors forming the turns of corresponding ones of the upper and lower whole and the half-coils alternately and produces electromagnetic poles centered between adjacent terminal pads that are of alternating magnetic direction and of the same electrical phase. A 180° electrical angle is defined between adjacent ones of the electromagnetic poles, that preferably is selected to be generally equal to the angle subtended by a permanent magnet pole pair. It will be appreciated that a flexible printed circuit phase winding including the two upper whole-coils and the three lower whole-coils is specifically illustrated for purposes of explication.

A plurality of printed circuit phase windings 34 are laminated one on top the other to provide a winding assembly having an intended ampere-turn condition. The flexible printed circuit phase winding of each of the layers is adhesively or otherwise fastened to the layers adjacent thereto and the entire assembly is adhesively fastened or otherwise mounted to the magnetic circuit device 26 (FIG. 1). Each of the flexible printed circuit phase windings, when mounted to the magnetic circuit device 26, may have a length selected to subtend more than, less than, or 360 mechanical degrees without departing from the inventive concept. For example, multiple lengths of phase windings may be turned on themselves to respectively form a spiral having interturn physically aligned coils all of the same phase and selectively mechanically displaced each to the other to form multiple phases.

The layers of the printed circuit phase windings are selectively aligned mechanically and interconnected electrically to provide a winding assembly having one or more phases. For a single phase winding assembly, the coils of adjacent flexible printed circuit phase windings are layered in physical and mechanical alignment and are preferably serially connected by electrical conductors extending between corresponding ones of the end terminal pads of each of the phase windings. For a two phase winding assembly, one-half of the phase windings are layered in physical and mechanical alignment and serially connected electrically to provide a first group of electromagnetic poles having a common phase; the other one-half of the phase windings are layered in physical and mechanical alignment and also serially connected electrically to provide a second group of electromagnetic poles having a common phase. Preferably, every other one of the layers of printed circuit phase windings of the winding assembly are mechanically aligned and serially connected to provide the first group of electromagnetic poles, and every other one of the remaining layers of printed circuit phase windings are mechanically aligned and serially connected to provide the second group of electromagnetic poles. The intensity of the magnetic field produced by the permanent magnets varies radially in the magnetic gap. The serial electrical interconnection of non-adjacent phase windings is preferred to help provide a uniform torque characteristic. The printed circuit phase windings of the first and second groups are laterally offset from each other a distance that corresponds to 90 electrical degrees to provide a two-phase winding assembly.

In a similar fashion, for a three phase winding assembly, every third one of the layers of the printed circuit phase windings are serially interconnected electrically and mechanically aligned to provide first, second, and third groups of coils having a common phase within each of the groups. The first, second, and third groups of coils are offset relative to each other a lateral distance selected to correspond to 120 electrical degrees to provide a three phase winding assembly. In general, it will be appreciated that an N phase winding can be provided.

Referring now to FIG. 4A, generally shown at 54 is an exploded perspective view of a preferred embodiment of a three-phase brushless DC torquer having a large magnetic gap and flexible printed circuit phase windings according to the present invention. The machine 54 includes a magnet assembly generally designated 56 for providing a predetermined number of substantially radially oriented magnetic poles of alternating polarity and a winding assembly generally designated 58 concentrically disposed around the magnet assembly. The assembles are separated by a small mechanical gap which allows the relative rotation of the magnet and the winding assemblies and are supported by a housing having the usual shaft and bearings, not illustrated. The winding assembly 58 preferably includes a lamination 60 having twelve layers of flexible printed circuit phase windings that are selectively aligned and interconnected to provide a three phase winding assembly, where the number of electromagnetic poles of each of the phases is equal to the number of permanent magnetic poles provided by the magnet assembly.

Referring now to FIGS. 4A and 4B, the magnet assembly 56 includes an annular highly-permeable magnetic circuit device 62 having a radially outwardly extending magnet support flange 64 and a radially inwardly extending apertured mounting flange 66. The circuit device 62 is constructed from any suitable highly ferromagnetic and/or easily saturable material such as iron. Support flange 64 provides shielding from permanent magnet axial leakage flux. If shielding is not required, support flange 64 may be a separate non-magnetic part adhesively or otherwise attached to magnet device 62.

A magnet self-fixturing member generally designated 68 having a ring 70 and circumferentially symmetrically disposed longitudinally extending spaced-apart teeth 72 is adhesively or otherwise mounted to the magnetic circuit device 62 with the ring 70 in spaced-apart relation to the flange 64 and with the teeth 72 in abutting relation with the confronting surface of the magnetic device 62. The self-fixturing member 68 is constructed from any suitable non-magnetic material such as a thermoplastic.

A plurality of Sm Co main magnets 74 are magnetically, adhesively, or otherwise mounted to the magnetic device 62 between and through the interspaces provided therefor between adjacent ones of the teeth 72 with their magnetic axes radially oriented and alternately north and south around 360 mechanical degrees. A like plurality of Sm Co interpole magnets 76 are adhesively or otherwise mounted between adjacent ones of the main magnets 74 circumferentially around 360 mechanical degrees with their magnetic axes generally transverse the magnetic axes of the main magnets with like poles in abutment therearound. The main and interpole magnets alternate in magnetic direction and define magnetic poles having magnetic centerlines along the main magnet centerlines that are subtended by the center lines of adjacent interpole magnets and generate a primarily radially-directed magnetic field. The interpole magnets typically are spaced apart from the magnetic device 62 a radial distance that corresponds approximately to one-quarter the length of the main magnet, but may vary from zero to more than one-half the magnet length in dependance upon the field characteristics required. The widths and axial length of the main and interpole magnets typically are equal. The axial lengths typically are also equal in length to the axial coil length of a whole-coil of a flexible printed circuit phase winding. It is to be noted that although samarium cobalt magnetic material is preferred, any other magnetic material having characteristic demagnetization curves similar to that for samarium cobalt can be utilized as well. An annular member 78 is mounted to the member 62 and around the magnets 74,76 to seal the magnet assembly 56.

Referring now to FIGS. 4A and 4C, the lamination 60 of the winding assembly 58 preferably has twelve layers of flexible printed circuit phase windings of the type described above in connection with FIG. 3 that are adhesively or otherwise fastened each to the other and to the inside circumference of an annular highly permeable magnetic circuit device 80. The flexible printed circuit phase windings of the winding assembly are selectively mechanically aligned and electrically interconnected by conductors extending between preselected ones of the end terminal pads of each of the layers of the flexible printed circuit phase windings in a manner to be described. The magnetic circuit device 80 is provided with a radially outwardly extending flange 82 having mounting apertures, and with a shoulder portion 84 defining an annular recess generally designated 86.

A plurality of conductors 88 are connected to preselected ones of the end terminal pads 48 (FIG. 3) of the flexible printed circuit phase windings that extend in the recess 86 for selective internal interconnection and external connection. A suitable insulative material 90 is potted in the recess 86 to insulate and stablize the conductors. An annular ring 92 is provided for sealing the winding assembly at one end, and an annular ring 94 is provided for sealing the winding assembly at the other end. It is to be noted that an aperture generally designated 96 formed in the ring 92 provides an opening through which external conductors, not shown, are admitted to the winding assembly.

Referring now to FIG. 4D, generally shown at 100 is a schematic diagram illustrating a preferred interconnection of the twelve flexible printed circuit phase winding of the winding assembly of the three-phase brushless DC torquer having a large magnetic gap according to the present invention. Each of the twelve printed circuit phase windings are schematically designated by coils 102 through 124 interconnected in a standard three-phase "Y" configuration. The three phases are designated $\phi_A$, $\phi_B$, and $\phi_C$. The A phase consists of a first group of flexible printed circuit phase windings 104, 110, 116, and 122. The B phase consists of a second group of phase windings 102, 108, 118, and 124. The C phase consists of a third group of phase windings 120, 114, 112, and 106. The windings in a phase are serially connected electrically and the individual coils thereof are in mechanical alignment as abovedescribed. The serially connected flexible printed circuit phase windings of each group have a common phase and are circumferentially displaced relative to the phase windings that constitute the other phases by 120 electrical degrees.

Figure 4E:
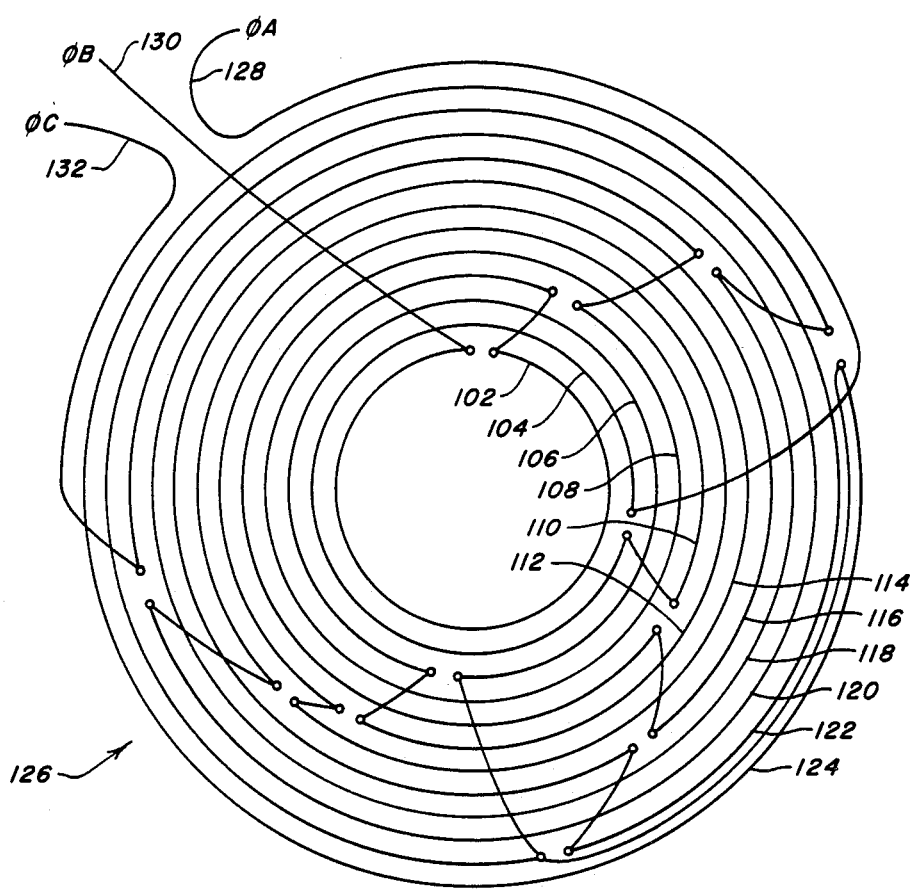

Referring now to FIG. 4E, generally shown at 126 is an exploded diagrammetric view illustrating the internal and external connections of a winding assembly interconnected in accordance with FIG. 4D. External conductors 128, 130, and 132 are respectively connected to the end terminal pads of the strips 104, 102, and 120. The other end terminal pad of the strips 104, 102, and 120 are respectively interconnected by an electrical wire to the printed circuit phase windings 110, 108, and 114. The electrical interconnection between the other printed circuit phase windings follows the schematic of FIG. 4D in a similar manner. It will be appreciated that although in the preferred embodiment the permanent magnetic structure is mounted for rotation relative to the winding assembly, the winding assembly may be mounted for rotation relative to the magnet assembly without departing from the inventive concept.

Figure 5B:
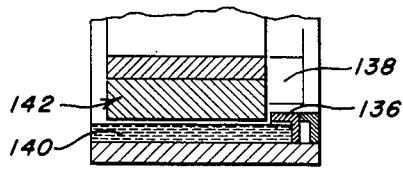
FIG. 5 shows in FIG. 5A a diagrametric view of, and shows in FIG. 5B a schematic view of, a brush-type DC torquer embodying the large magnetic gap dynamoelectric machine having flexible printed circuit phase windings of the present invention.
Figure 5A:
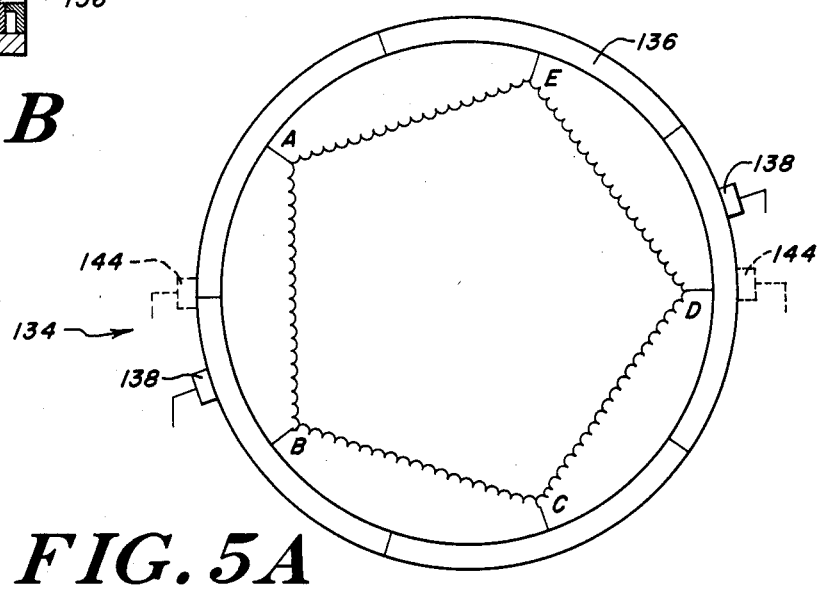

Referring now to FIG. 5A, generally shown at 134 is a schematic diagram of a brush-type DC torquer having a large magnetic gap and flexible printed phase circuit windings according to the present invention. The machine 134 is specifically illustrated as a two pole five phase torquer for simplicity of explication although it will be appreciated that any number of phases and poles can be provided to suit the requirements of a particular application. A winding assembly generally designated 135 having five phases designated AB, BC, CD, DE, and EA is connected via a five-segment commutator 136 to a pair of brushes 138. As shown in FIG. 5B, the commutator 136 is attached to a winding assembly schematically shown at 140 and the brushes 138 are attached to a magnet assembly generally designated 142. The position of the brushes 138 in FIG. 5A is that which corresponds to a maximum torque characteristic, and the position of the brushes shown in dashed line at 144 correspond to that for a minimum torque characteristic. It is to be noted that in the embodiment of the brush-type DC torquer of FIG. 5, the winding assembly 140 is mounted by means, not shown, for relative rotation with the magnet assembly 142, which may be reversed without departing from the inventive concept. The selection of the number of phases for a particular application is a trade-off between ripple torque, resistance variation, and mechanical limitations. Ripple torque and resistance variation are improved by increasing the number of phases, but the number of commutator bars also increase along with increased wiring connections. In a multiple pole-pair configuration, the sequence of switching is repeated for each pole pair. The magnet poles are fixed 90° in phase with the brushes.

Many modifications of the presently disclosed invention are possible. For example, stepper motors and synchronous motors can be constructed embodying the large magnetic gap dyamoelectric machine having printed circuit phase windings of the present invention. The invention may also be configured as an "ironless rotor" motor. In this configuration, an additional air gap separates the winding assembly from its associated magnetic device and is fixed with respect to the magnet assembly. This type of arrangment can be used where a high torque to inertia ratio is desired. In addition, the annular highly-permeable magnetic devices may be of a laminated construction to reduce eddy current losses and/or for ease of construction. Printed circuit windings or other electromagnet structures other than that specifically illustrated can also be employed. Hall devices could be laminated to a printed circuit flexible strip, and laminated with the other phase windings, to provide commutation position signals. A phase winding could be incorporated into the winding assembly to provide a tachometer output signal. The magnet and winding assemblies may also be disc-shaped and axially displaced relative to each other having an axial air gap.

Other modifications of the presently disclosed invention will be readily apparent to those skilled in the art without departing from the scope of the appended claims.

What is claimed is:

1. A dynamoelectric machine having a large magnetic gap and printed circuit phase windings, comprising:
    a first ring of a material defining a closed highly-permeable magnetic path;
    a permanent magnet assembly having permanent magnets circumferentially mounted to the first ring for providing permanent magnetic poles of alternating polarity;
    a second ring of a material defining a closed highly-permeable magnetic path disposed coaxially with the first ring and defining a magnetic gap between the end of the permanent magnets remote from the first ring and the confronting surface of the second ring;
    a printed circuit phase winding positioned entirely in said magnetic gap for providing electromagnetic poles that are cooperative with the permanent magnet poles for producing torque;
    said printed circuit phase winding includes a lamination of a preselected number of flexible printed circuit phase windings selectively aligned mechanically and innerconnected electrically to provide a winding assembly having at least one phase;
    each of said flexible printed circuit phase windings includes an array of mechanically adjacent and serially electrically connected printed circuit coils having a common phase.

2. The apparatus of claim 1, wherein said permanent magnet assembly includes Sm Co permanent magnets.

3. The apparatus of claim 2, wherein said Sm Co magnets are selected to operate at or near their point of maximum energy product.

4. The apparatus of claim 1, wherein said permanent magnet assembly includes radially aligned and spaced-apart main magnets circumferentially disposed symmetrically on the first ring, and interpole magnets disposed between and abutting adjacent ones of the main magnets with similar magnetic poles in abutment.

5. The apparatus of claim 1, wherein said magnet assembly includes magnets having characteristic demagnetization curves similar to that for Sm Co magnet material.

6. The apparatus of claim 1, wherein said printed circuit phase windings each include a flexible substrate having top and bottom metalization patterns defining coils each having a central terminal pad; and means for electrically connecting the terminal pads of adjacent top and bottom coils to provide said serially electrically connected coils having a common phase.

7. The apparatus of claim 1, wherein said first and second rings are Fe.

8. The apparatus of claim 7, wherein said second ring is disposed coaxially around the first ring.

9. The apparatus of claim 7, wherein said second ring is disposed coaxially within the first ring.

10. The apparatus of claim 1, wherein said printed circuit phase winding includes a lamination of a preselected number of flexible printed circuit phase windings selectively aligned mechanically and innerconnected electrically to provide a winding assembly having at least two phases; each of said flexible printed circuit phase windings includes an array of mechanically adjacent and serially electrically connected printed circuit coils having a common phase.

11. A dynamoelectric machine, comprising:
first means for providing a plurality of magnetic poles;
a first line array of mechanically adjacent and serially electrically connected printed circuit coils having a common phase disposed on a flexible substrate for providing a plurality of electromagnetic poles having a common phase; and
third means defining a magnetic gap for supporting said first means and said first line array for relative rotation in such a way that said line array is entirely disposed in said magnetic gap.

12. The machine of claim 11, wherein said third means includes a first member having a high magnetic permeance in spaced-apart relation to a second member having a high magnetic permeance.

13. The machine of claim 12, wherein said first and said second members are iron rings.

14. The machine of claim 11, further including a second line array of mechanically adjacent serially electrically connected printed circuit coils having a common phase disposed on a flexible substrate, said second line array fastened to said first line array such that individual ones of said coils of said first array are selectively aligned relative to mechanically adjacent coils of said second line array to provide a plurality of electromagnetic poles having a single phase.

15. The machine of claim 11, further including a second line array of mechanically adjacent serially electrically connected printed circuit coils having a common phase disposed on a flexible substrate, said second line array fastened to said first line array such that individual ones of said coils of said first array are selectively aligned relative to mechanically adjacent coils of said second line array to provide a plurality of electromagnetic poles having two phases.

16. The machine of claim 11, wherein said first means includes a plurality of Sm Co main magnets in spaced-apart relation such that adjacent main Sm Co magnets have alternating magnetic direction, and a plurality of interpole magnets positioned between adjacent ones of said main magnets, such that like poles of said interpole magnets are in close proximity to like poles of individual ones of said adjacent main magnets.

17. The machine of claim 15, further including a commutator, and means for electrically connecting said commutator to said first and said second line arrays.

18. The machine of claim 11, wherein the plurality of mechanically adjacent and serially electrically connected printed circuit coils disposed on a flexible substrate include upper and lower line arrays of coils disposed on the upper and the lower surface of the flexible substrate, and further include means for interconnecting the upper and the lower coils to provide said serial electrical connection.

19. The machine of claim 18, wherein each of said coils include a half-coil having turns spiralling in an electrically clockwise direction serially connected to, and integrally formed with, a half-coil having turns spiralling in an electrically counterclockwise direction.

20. The machine of claim 19, wherein a terminal pad is centrally located in each of said half-coils, and wherein said interconnection means is a plated through hole extending between adjacent terminal pads of the upper and lower half-coils.

* * * * *